May 3, 1966 K. FRANCK 3,249,750
STREET LIGHTING LUMINAIRE
Original Filed Feb. 4, 1958 3 Sheets-Sheet 1
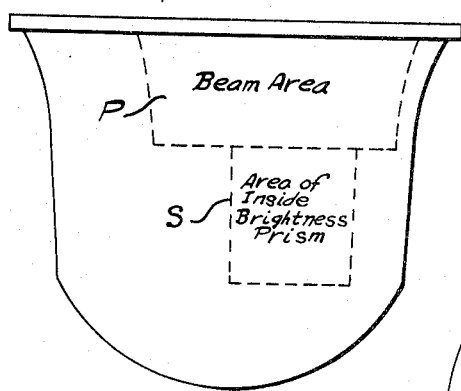
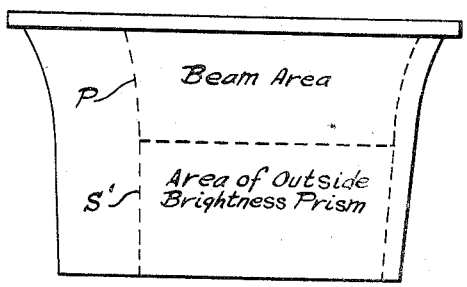
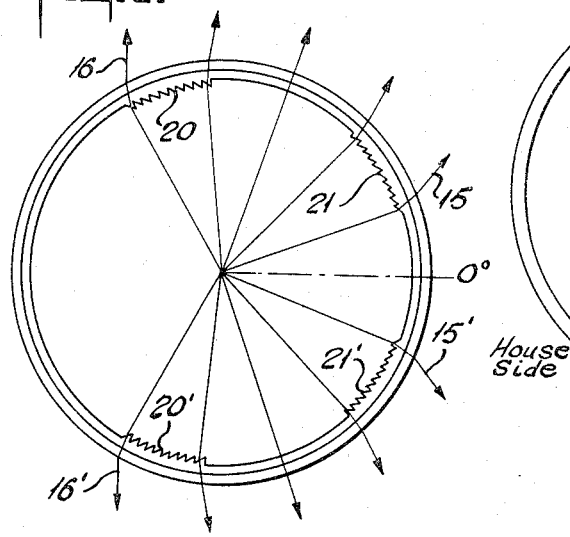
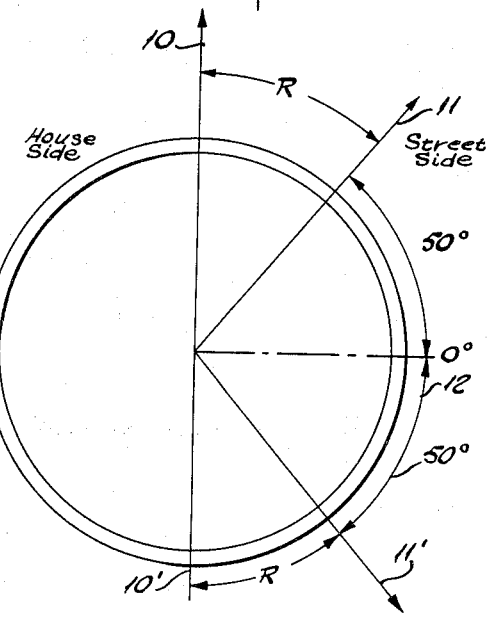
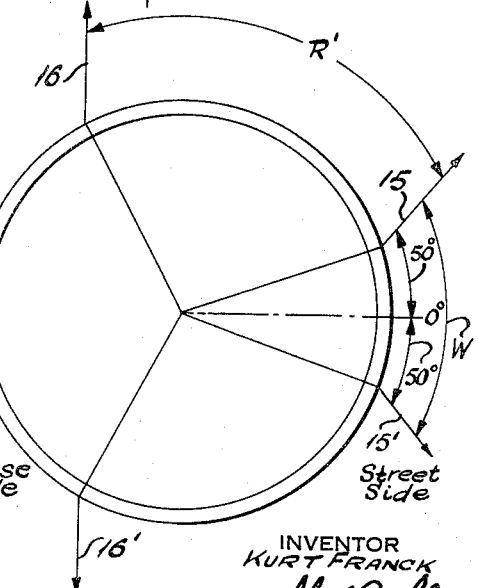
INVENTOR
KURT FRANCK
BY
ATTORNEYS May 3, 1966 K. FRANCK 3,249,750
STREET LIGHTING LUMINAIRE
Original Filed Feb. 4, 1958 3 Sheets-Sheet 2

INVENTOR
KURT FRANCK
BY
ATTORNEYS

May 3, 1966 K. FRANCK 3,249,750
STREET LIGHTING LUMINAIRE
Original Filed Feb. 4, 1958 3 Sheets-Sheet 3
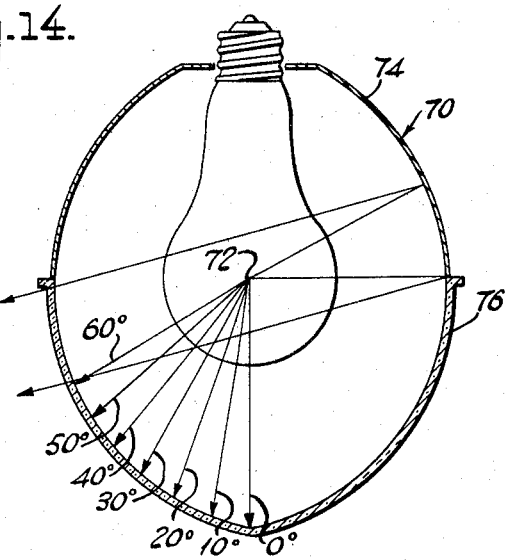
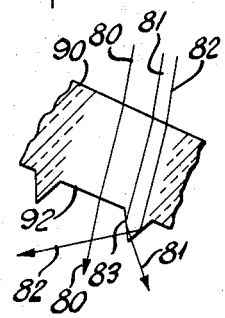
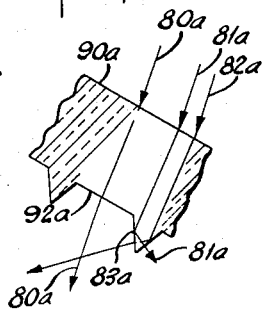
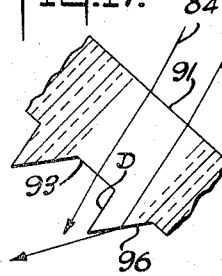
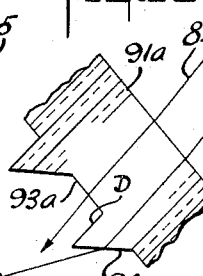
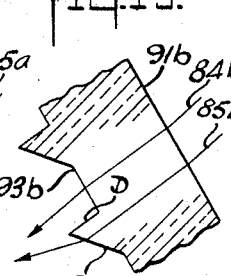
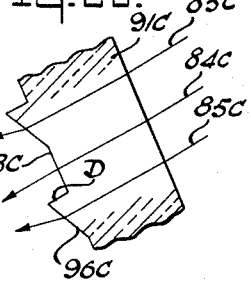
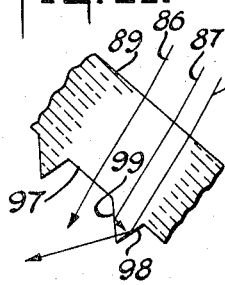
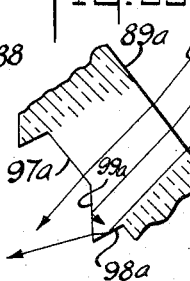
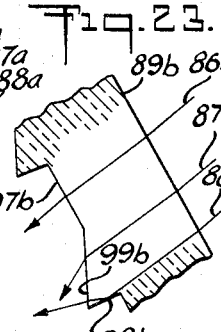
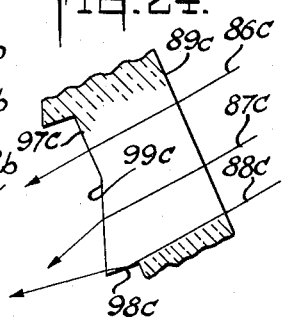
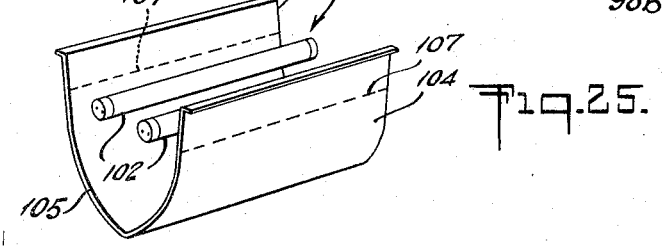
INVENTOR
KURT FRANCK
BY *Nolte & Nolte*
ATTORNEYS United States Patent Office 3,249,750
Patented May 3, 1966

3,249,750
STREET LIGHTING LUMINAIRE
Kurt Franck, Newark, Ohio, assignor to Holophane Company, Inc., New York, N.Y., a corporation of Delaware
Continuation of application Ser. No. 713,208, Feb. 4, 1958. This application Apr. 1, 1963, Ser. No. 274,890
1 Claim. (Cl. 240—25)

This is a continuation of application Serial No. 713,-208, filed February 4, 1958, now abandoned.

This invention relates to street lighting luminaire brightening or elevating prisms.

It is an object of this invention to provide a luminaire, having brightening prisms on its outer surface which are adapted to elevate or depress, as desired, the light passing therethrough to a given beam angle.

It is yet another object of this invention to provide still additional prisms which would be light reflecting prisms adapted to raise some of the light, in the lower portion of the luminaire, substantially below the light center, to the beam angle.

Other and further objects will appear as the description proceeds.

In order to illuminate parts of the pavement or street, remote from the street lighting luminaire with sufficient intensity, it is necessary that the luminaire produce a beam of high candlepower at angles generally between 70° and 80° from nadir.

Brightness is generally calculated by dividing the candlepower by the area of the bright part of the luminaire at the angle from which it is viewed. If the beam of the street light can be generated from all or nearly all parts of the glass visible in beam direction, the area of the beam will be increased and the brightness reduced.

In the case of lateral refractors where all of the prisms are on the inside surface of the refractor, this has already been done by a series of horizontal prisms as shown in Rolph Patent No. 2,474,326, dated June 28, 1949. However, if outside brightening or elevating prisms are used, this result can be accomplished more effectively.

In order to form a beam of sufficient candlepower from the light directly emitted by a light source, without the interposition of a reflector, a sufficient number of depressing and/or elevating prisms must be used. In addition to these prisms, however, prisms primarily designed for providing light for other parts of the illumination pattern generally below beam level, can be provided with small surfaces which will send light at beam elevation, thus increasing apparent area of the beam.

In determining the area of the refractor wherein the brightening prisms are to be used, consideration must be given to the fact that light passing through the refractor which is being directed to the house side of the lighting fixture, should not be brightened because this light would be both unnecessary to lighting the street and also inconvenient to the occupants of the houses.

Similar consideration must be given to the dwelling area directly across the street from the lighting fixture as there would be no advantage gained from throwing the light directly across the street in greater intensity than would be normal through a refracting luminaire, since this light, likewise, would not in any way increase the illumination on the street.

Generally speaking, the brightening prisms may extend over that area of the refractor which by the action of the lateral inside prisms directs light to the street surface.

It has been found that when vertical prisms are placed on the inside of the refractor so as to laterally redirect the light, that this lateral redirection will not be affected substantially by the use of outside brightening prisms to elevate and/or depress the light emitted through the refractor.

By the use of the combination of the inside vertical prisms and the outside light elevating or brightening prisms, as against the use of inside brightening prisms, we have provided for an increased area within which brightening prisms may be used to elevate the light, which would normally fall on the nearer areas of the street, and emit this added light through the brightening prisms on the outer surface of the refractor at the desired beam angle, which is generally regarded as being between 70° and 80° from nadir.

The accompanying drawings show, for purposes of illustrating the present invention, one embodiment in which the invention may take form, together with modifications of certain parts, it being understood that the drawings are illustrative of the invention rather than limiting the same.

When outside brightening prisms are used rather than inside brightening prisms, the vertical range of action is greater because it is more readily possible to use reflecting action on the outside than on the inside. In addition, there is a manufacturing advantage in the use of outside prisms, because the outside prisms, being pressed by the mold, can have a wider variety of angles, since the mold can be of the "open-and-shut" type. Inside brightening prisms, which are formed by a plunger, do not have such a wide range of angles, because draft considerations in retracting the plunger must be taken into account.

In addition, when the vertical range of action is increased, it becomes possible to provide brightening prisms on refractors of the open bottom variety which not only has the advantage of the utilization of these prisms but also may be relamped without removal thereof from the luminaire with which it is associated.

In addition, when employing a laterally symmetrical elongated luminaire, there may not be any vertically extending, laterally acting, refracting prisms on the inside of the luminaire. However, the brightening prisms on the outside would still provide the advantages described above.

In the accompanying drawings:

FIGS. 1 and 2 are diagrammatic elevation and plan views respectively of a refractor showing the area thereof which may be used for inside brightness producing prisms;

FIGS. 3 and 4 are views of a refractor similar to those of FIGS. 1 and 2 showing the utilizable area for outside brightening prisms;

FIG. 5 is a diagrammatic top view of a refractor showing the beam forming prisms;

FIG. 14 is a diagrammatic sectional view of a luminaire constituting another embodiment of the invention;

FIGS. 15 to 24 show the configuration of the prisms which may be used on various areas of the refractor shown in FIG. 14; and FIG. 25 is a diagram of a rectangular refractor according to the invention.

Figures 6, 13:
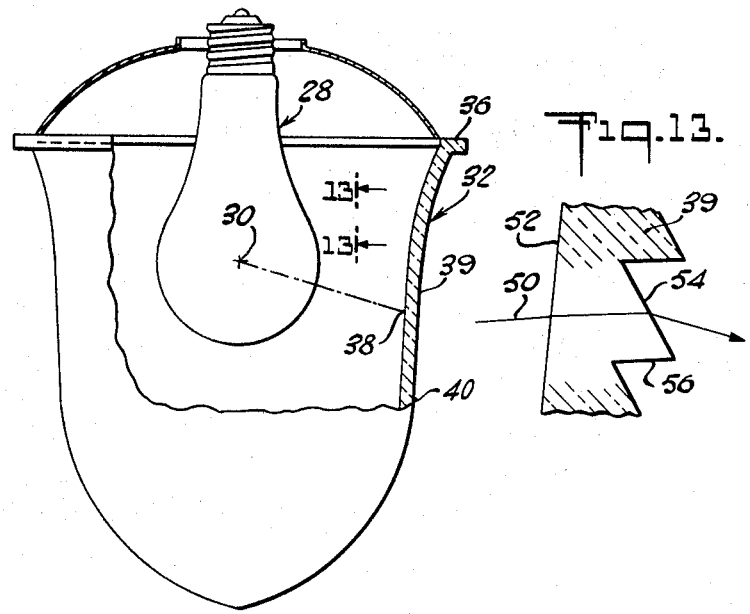
FIG. 6 is an outline drawing of a luminaire according to the invention.
FIG 13 is a fragmentary sectional view on the plane 13—13 of FIG. 6 showing the beam forming prisms.

It is obvious that two different prisms cannot occupy the same place on the same surface of a refractor. Consequently, if brightening prisms which elevate or depress the light rays were placed on the inside of a refractor, they could be used only on portions of the refractors which received light already laterally oriented in beam direction. If the brightening prisms, however, are located on the outside of the refractor, they would not interfere with the lateral redirective action of the vertical inside prisms, and can, therefore, be used over a much larger area of the refractor.

Referring to FIGS. 1 and 2, let us assume that beams having angular directions R are desired. The beam has limiting rays 10 and 11. The inside area S (FIG. 1) which could be employed for brightening prisms for elevating the lower rays of light up to the beam angle must be confined within the limits of rays 10, 11, 10' and 11'. It may be noted that in FIG. 2, the rays 10 and 10' form angles of 90° with the transverse direction 12 and rays 11 and 11' form angles of 50° with the 0° direction 12.

Now referring to FIGS. 3 to 5, if laterally refracting inside prisms are used, the 50° and 90° limiting rays 15, 16 and 15', 16' subtend an arm R', defining a much larger area S' than the area S of FIG. 1. It is clear then the brightening prisms placed on the outside of the refractor, rather than on the inside, can be used throughout the much larger area S'.

Between the limiting rays 15, 16 and 15', 16' the refractor is provided with vertically extending beam forming prisms 20, 20', 21, 21' which converge the light along the street. These prisms extend through the beam area P and the brightening prism area S', and may cover other portions of the inside area of the refractor.

Referring to FIG. 6, there is shown a conventional light source 28 having a light center 30. A refractor 32 surrounds the light source and is suitably supported by conventional means. The light from light center 30, passing through the refractor 32, includes rays which will have to be bent downward in order to be emitted at the desired beam angle, other rays which will have to be raised to be emitted at the beam angle, and still other rays which will have to be greatly raised or elevated in order to be transmitted at the beam angle.

Accordingly, the rays which will pass through the refractor between the points 36 and 38 on the wall 39 of the refractor would have to be bent downward in order to illuminate the distant areas of the street. The point 38 is that point where a light ray from the center 30 in beam directions of ray 75° strikes the wall 39. As shown in FIG. 13, light ray 50 entering the refractor at, for example, an angle of 95° would be bent by the surface 52 of the refractor wall 39 and would pass through at an angle of 92° to be emitted through prism surface 54 at the beam angle of between 70° and 80°. In this construction, the surface 52 might have a slope angle of substantially 5° and the surface 54 a slope angle of approximately 30°. The angle of surface 56 would be 92°, the angle at which the beam 50 passes through the refractor wall 39.

By using this prismatic construction in the area of the refractor between points 36 and 38, the light would be downwardly bent so as to be emitted from the refractor at the desired beam angle of between 70° and 80°.

Referring now to the light rays passing through the refractor between the point 38 and a point 40, additional prisms are provided to raise some of the light directed through this area, so that it would be emitted at the beam angle.

Various types of prisms could be used in this brightening prism area, examples of which are illustrated in FIGS. 7 through 12, inclusive. In each of these figures, the surface marked "A" is the major surface of the prism, the surface marked "B" is the surface emitting light at beam elevation, and the surface marked "C" is a neutral surface which receives no light.

In the configurations illustrated in FIGS. 7–12, the slope 52a would be 5°. Side A slopes at 3½° in FIGS. 7, 8 and 9, at 5° in FIG. 10, at 23° in FIG. 11 and at 8° in FIG. 12. Side B slopes so as to emit light at beam angles of 70° to 80° and may be 25° in FIGS. 7, 8, 9 and 10, at 50° in FIG. 11, and at 75½° in FIG. 12. The slope of side C would be in all cases equal to the angle at which the light is passing through the wall 39 of the refractor. All the slope angles are with respect to nadir.

Figure 7:
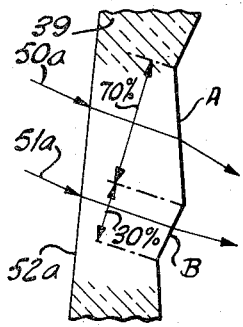
FIGS. 7 to 12 show various configurations of brightness controlling prisms which may be used on the outside of the refractor shown in FIG. 6.

FIG. 7 shows the simplest combination of the surfaces. Surface A depresses some of the light slightly and surface B raises some of the light to beam elevation. In this design, the proportion of light falling on surfaces A and B is determined by their slopes and cannot be controlled independently. In FIG. 7, light rays 50a, 51a entering at approximately 65° through the surface 52a would be bent slightly upward to pass through the wall 39 of the refractor at 72°. The light emitted by surface A would be bent downward so as to be emitted at 60° while the light passing through surface B would be bent upward to be emitted at substantially the beam angle of between 70° and 80°.

Figure 8:
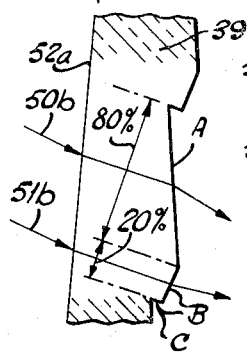

In FIG. 8, if it is desired to intercept 20% of the light by surface B and 80% of the light by surface A, a small neutral surface C may be employed. Rays 50b and 51b entering at approximately 65° would be bent upwards to pass through wall 39 at 72°. The light would be emitted by surfaces A and B at the same angles as in FIG. 7.

Figure 9:
Figure 10:
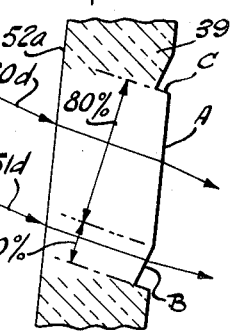

In the modification shown in FIG. 9, an equal amount of light is received and emitted by both surfaces A and B. The neutral surface C is at the top of the prism while in FIG. 8 it is at the bottom of the prisms. The location of the neutral surface C is dependent upon the slope of the two active surfaces A and B, and also upon the quantity of the light to be received by each. The light rays 50c and 51c will be received and emitted at the same angles as hereinabove set forth in FIGS. 7 and 8.

It is possible that no redirection of light may be desired from the main surface A of the prism, and yet it may be desirable to send some light in the beam direction. This can be accomplished by the prismatic construction shown in the modification of FIG. 10, wherein surface A is parallel to the surface 52a of the refractor. Here again, neutral surface C is positioned at the top of the prisms. Light ray 50d will then enter and be emitted at the same angle while light ray 51d would be emitted by surface B at beam elevation.

Figure 11:
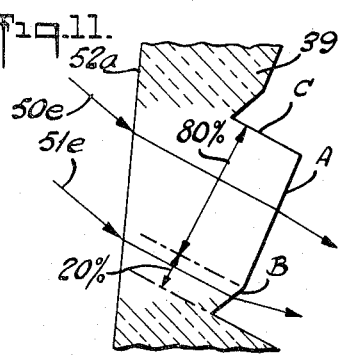

In the modification shown in FIG. 11, surface A elevates the light instead of depressing it. Incident light 50e enters at an elevation of 50° and is emitted by surface A at an elevation of 60° while the ray 51e, entering at 50° is emitted through surface B at beam elevation.

Figure 12:
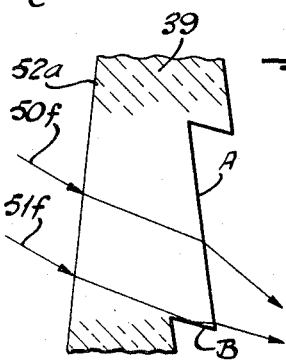

In FIG. 12, surface B is shown to be a reflecting surface instead of a refracting surface. In this case no light is emitted by surface B, but the light which is incident on surface B is reflected at a higher angle and is subsequently refracted by surface A so that it is emitted at substantially beam elevation. Light which is not incident on surface B is refracted by surface A at a lower elevation than it has entered the prisms. Light ray 50f entering at 60° is emitted by surface A at 50° and light ray 51f entering at 60° is reflected by surface B and refracted by surface A so as to be emitted at beam elevation.

It can be seen that by using various slopes for the surfaces A and B, and 52a, and also by using neutral surface C, the proportion of light passing through the prisms may be controlled. In this manner a selected amount of light may be emitted at beam elevation while the remainder of the light may be emitted at any desired angle to fill out the illumination pattern.

Therefore, by using selected ones of the prismatic constructions illustrated in FIGS. 7 through 12, light which normally would be directed downwardly into the areas near the refractor may be elevated so as to be emitted at substantially beam elevation. Therefore, the distant areas of the street have additional light to illuminate them. Not all of the type of brightening prisms illustrated in FIGS. 7 through 12 need occur on a single refractor. The choice of the type of prisms depends upon design requirements. For example, the refractor of FIG. 6 may include a plurality of prisms shown in FIG. 8 and below these a prism of the type shown in FIG. 10, and below this prism and down to line 40, remainder of the brightening prisms may be of the type shown in FIG. 11.

Referring now to FIG. 14, a luminaire 70 has a light source with a center 72 in the horizontal plane of the juncture of reflector 74 and refractor 76. The general area of the refractor within the limits of angle R' (FIG. 4) which receives beams of light from the light source 72 and reflector 74 at substantially the beam angle is provided with no horizontal prisms on the outer surface. The inner surface has the vertical prisms hereinabove described throughout that area.

For light which impinges upon the inner surface of refractor 76 at angles from approximately 60° down to 10°, taken from nadir, brightening prisms similar to those illustrated in FIGS. 15 through 24 are used to elevate some of this light to beam elevation.

At the lower angles of 10° to 20°, prisms as illustrated in FIGS. 15, 16 would generally be employed. These prisms are not refracting prisms but are reflecting prisms. Refracting prisms would be unable to lift light at these angular positions sufficiently, while reflecting prisms are quite practical and efficient. The prisms of FIGS. 15 and 16 permit some of the light to be reflected downward to give a smooth illumination pattern. Thus, light rays 81, 81a are reflected downwardly by surfaces 83, 83a of the reflecting prisms. In addition, the prisms in FIGS. 15 and 16 have surfaces 92, 92a between the outside brightening prisms which are parallel to the inner surfaces 90, 90a of refractor 76 to form non-refracting areas for light rays 80, 80a. In both FIGS. 15, 16 a small amount of light identified as rays 82, 82a is elevated and emitted at generally the beam elevation of between 70° and 80°. In FIG. 15, when the light rays are incident at 10°, the inner surface 90 and the outer surface 92 of the refractor wall would slope at approximately 22° measured from the horizontal. In FIG. 16, the slope of the surfaces 90a, 92a, would be approximately 31° measured from the horizontal.

As the impinging angle of the light rays reaches 30° to 60°, the prismatic constructions of FIGS. 17–24 may be used. In FIGS. 17–20 there are shown prisms having neutral surfaces D which function and are constructed in the same manner as surface C of FIGS. 8–11. By the use of surfaces D, the amount of light passing through the surfaces 93, 93a, 93b and 93c, compared with the light emitted by surfaces 96, 96a, 96b, 96c may be controlled. Light rays 84, 84a, 84b, 84c impinging on surfaces 91, 91a, 91b and 91c are emitted at the same angle by surfaces 93, 93a, 93b, 93c. On the other hand, the light rays 85, 85a, 85b, 85c are elevated by refraction of surfaces 96, 96a, 96b, 96c to generally beam elevation.

In FIG. 17, surfaces 91, 93 are parallel and slope generally at 41° with respect to the horizontal and rays 84, 85 impinge on surface 91 at approximately 30° from nadir. In FIG. 18, surfaces 91a, 93a are parallel and slope at an angle of substantially 50° with respect to the horizontal and rays 84a, 85a impinge on the surface 91a at an angle of approximately 40° from nadir. In FIG. 19, surfaces 91b, 93b are parallel at a slope angle of approximately 61° from the horizontal and light rays 84b, 85b impinge upon surface 91b at substantially an angle of 50°. In FIG. 20, surfaces 91c, 93c are parallel at a slope angle of approximately 67° with respect to the horizontal and light rays 84c, 85c impinge upon the surface 91c at substantially an angle of 60°.

In FIGS. 21 and 22, light rays 87, 87a are reflected downwardly by surfaces 99, 99a and in FIGS. 23 and 24 the light rays 87b, 87c are refracted downwardly by surfaces 99b, 99c. In this manner, additional filling out of the general illumination pattern below the luminaire is obtained. The light rays 86, 86a, 86b and 86c of FIGS. 21–24 are emitted by surfaces 97, 97a, 97b and 97c at the same angle at which they enter while the light rays 88, 88a, 88b, 88c will be reflected by surfaces 98, 98a, 98b and 98c so as to be emitted through the surfaces 99, 99a, 99b and 99c at substantially the beam elevation.

FIG. 21 shows a prism wherein the surfaces 89 and 97 are parallel and have a slope at 41° from the horizontal and the rays 86, 87, 88 impinge upon the surface 89 of the refractor at approximately 30° from nadir.

FIG. 22 shows a prism wherein surfaces 89a, 97a are parallel and have a slope of 50° with respect to the horizontal and rays 86a, 87a, 88a impinge upon the surface 89a at substantially an angle of 40° with respect to nadir.

FIG. 23 shows a prism wherein surfaces 89b and 97b are parallel and have a slope of approximately 61° from the horizontal and rays 86b, 87b, 88b impinge upon the surface 89b substantially at an angle of 50° with respect to nadir.

FIG. 24 shows a prism wherein surfaces 89c and 97c are parallel and have a slope of substantially 67° from the horizontal and rays 86c, 87c, 88c impinge upon the surface 89c at substantially an angle of 60° with respect to nadir.

In selecting the particular refracting or reflecting prism for a given refractor, any of those illustrated in FIGS. 17–24 of appropriate angles of incidence would be satisfactory for light impinging on the refractor inner surface between 30° and 60°. In practice, however, it has been found preferable to use the refracting prisms for the higher angles of incidence, for example, between the ranges of 60° down to 40° illustrated in FIGS. 18, 19 and 20, while the reflecting type of prism illustrated in FIGS. 15, 16, 21 and 22 are employed in the lower ranges of, for example, 10° to 40°.

Referring now to FIG. 25, the laterally symmetrical luminaire 100 shown is intended for use with linearly extending light sources such as fluorescent lamps. In FIG. 25, there is shown a plurality of fluorescent lamps 102 located at substantially the same relative level as the point light source 30 of FIG. 6. The luminaire 100 extends longitudinally of the fluorescent lamps so as to form an elongated trough surrounding the fluorescent lamps 102. The trough is formed with open ends at 105 and 106. This trough may have a transverse cross-sectional form similar to that of the refractor shown in FIG. 1, 6 or 14. In such a construction, brightening prisms may be used on the outside of the linearly extending body in area 104 below the horizontal plane through line 107. The outside prism arrangement may be like those described above in connection with FIGS. 1–24. No lateral acting prisms may be needed on the inside of the refractor to control the light lengthwise of the light source. It will be understood that the luminaire of FIG. 25 may include a suitable reflector of the type shown in FIG. 6 or 14.

In this specification, we have described the embodiments shown by indicating angular values for the slopes of the various prismatic surfaces. It is understood that these angular values have been assigned only to illustrate the invention, and are not intended in any way to limit the scope, but what is desired to be covered by Letters Patent is set forth in the appended claim.

I claim:

In a street lighting luminaire the combination comprising a concentrated light source, a reflector above the light source and having a downwardly directed mouth, said reflector reflecting light across the vertical axis of the luminaire, a substantially cylindrical refractor having an open bottom and being circular in horizontal cross-section, said refractor surrounding the light source with the light source disposed centrally of the refractor and intermediate the top and the horizontal median plane thereof, the top of said cylindrical open bottom refractor consisting of an upwardly facing mouth directed towards said mouth of said refractor, means adjacent said reflector and said refractor top for operatively mounting said light source, said refractor receiving said reflected light and transmitting the same downwardly and outwardly of said luminaire, the upper portions of the refractor receiving direct light from the light source, first prisms on said upper portions transmitting the direct light from said light source at a predetermined beam angle above nadir, the lower portions of said refractor including means for primarily receiving direct light from said light source at downwardly diverging angles below said predetermined beam angle, said lower portions of said refractor extending substantially vertically and at acute angles to the paths of light from said light source, second prisms on the outer surface of said lower portions of said refractor constructed and arranged and disposed by the extensions of said lower portions of said refractor to refract a minor fraction of light from said light source upwardly to said predetermined beam angle and for refracting a major fraction of light from said light source at downward increasingly diverging angles below said predetermined beam angle, said second prisms on the outer surface of said lower portions of said refractor consisting of vertically contiguous, horizontal and parallel prisms each having a first surface of relatively narrow vertical width intercepting a minor fraction of direct light incident upon each said prism and refracting the same upwardly to said predetermined beam angle and each said second prism having a second surface of relatively wide vertical width intercepting the major fraction of direct light incident upon each said second prism, said relatively wide vertical width surfaces of said prisms from the uppermost to the lowermost refracting the incident light at progressively steeper downward diverging angles below said predetermined beam angle, inactive third surfaces being provided between some of the vertically adjacent prisms, each of said inactive third surface extending outwardly of said refractor in the same general direction as the light passing through said refractor at the point of the outward extension of said inactive third surface, said third surfaces connecting said second surfaces and said first surfaces of vertically contiguous prisms thereby permitting said first and second surfaces to extend relative to said light source for intercepting said fractions of direct light, additional vertically contiguous horizontal and parallel prisms are provided below said second prisms and are provided with refracting surfaces which receive the major portion of direct light incident on said additional prisms and refract the same downwardly at angles considerably less than said beam angle and further surfaces are provided on said additional prisms which intercept a minor fraction of the light falling on said additional prisms and reflect the same upwardly into said predetermined beam angle, the arrangement being such that the vertical extension of said lower portions of said cylindrical refractor permits the utilization of said open bottom thereby permitting relamping of said street lighting luminaire without removal of said refractor while at the same time said vertical extension of said lower portion of said refractor permits the utilization of said second prisms on said lower portions of said refractor for directing light in beam direction and in said downwardly diverging downward angles from said beam direction.

References Cited by the Examiner
UNITED STATES PATENTS

| | | | |
|---|---|---|---|
| 1,644,915 | 10/1927 | Dorey | 240—25 X |
| 2,307,247 | 1/1943 | Tuck | 240—25 X |
| 2,474,326 | 6/1949 | Rolph | 240—25 |
| 2,721,931 | 10/1955 | Franck | 240—25 X |

NORTON ANSHER, *Primary Examiner.*